(No Model.)

G. F. BURKHARDT.

FILTER.

No. 248,575. Patented Oct. 25, 1881.

Attest:
Louis Cohen,
W. H. Solomon.

Inventor:
Gottlieb F. Burkhardt,
per Edw. Dummer,
Atty.

United States Patent Office.

GOTTLIEB F. BURKHARDT, OF BOSTON, MASSACHUSETTS.

FILTER.

SPECIFICATION forming part of Letters Patent No. 248,575, dated October 25, 1881.

Application filed May 11, 1881. (No model.)

*To all whom it may concern:*

Be it known that I, GOTTLIEB F. BURKHARDT, a citizen of the United States, residing at Boston, in the county of Suffolk and State of Massachusetts, have invented a new and useful Improvement in Filters, of which the following is a specification, reference being had to the accompanying drawings.

My invention relates to a device, in combination with a mash-tub or other vessel or tank, having a strainer therein, whereby the liquid in said tub, vessel, or tank may be drawn off at or near the level of the surface of said liquid, in order that it may percolate slowly and evenly through the mash or other mixture to make the filtration complete and to prevent the strainer from being clogged.

The invention consists in a pipe or conduit having an outlet for said liquid, in combination with said tub, vessel, or tank, and connected to the same in such a manner as to be adjustable, so that the liquid may be allowed to flow from one and the same orifice, at or near the level of the liquid, as aforesaid, whatever may be the height of the same in the tank.

In a previous application for Letters Patent, I have described an arrangement of pipes and faucets, in combination with a mash-tub or other vessel or tank, having a strainer therein, said arrangement being such that by means of several orifices, with suitable faucets, in a vertical pipe, the liquid may be drawn off at different elevations. It is the purpose of the invention of the present application to accomplish a similar result by one orifice in a pipe which may be raised or lowered at will; and in the particular contrivance herein described in detail is a pipe having the outlet-orifice so connected as to be slid up and down in another pipe to bring said orifice in the position required.

Figure 1:
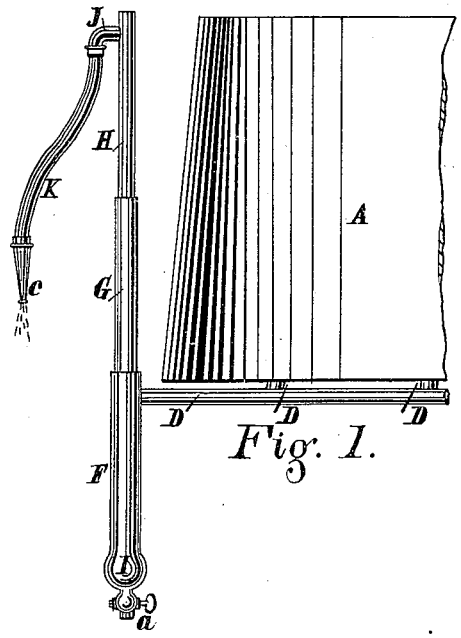
Figure 2:
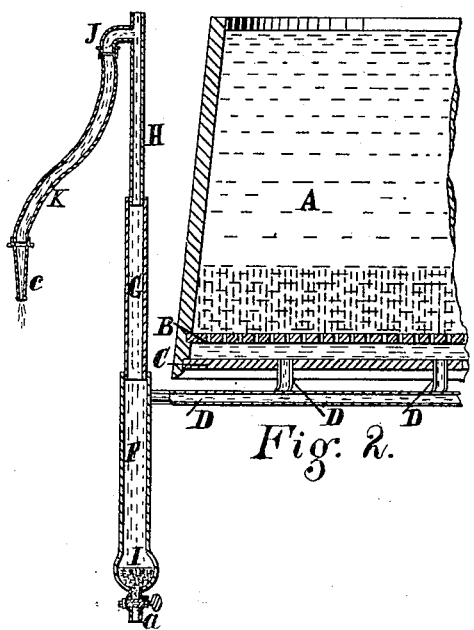
Figure 3:
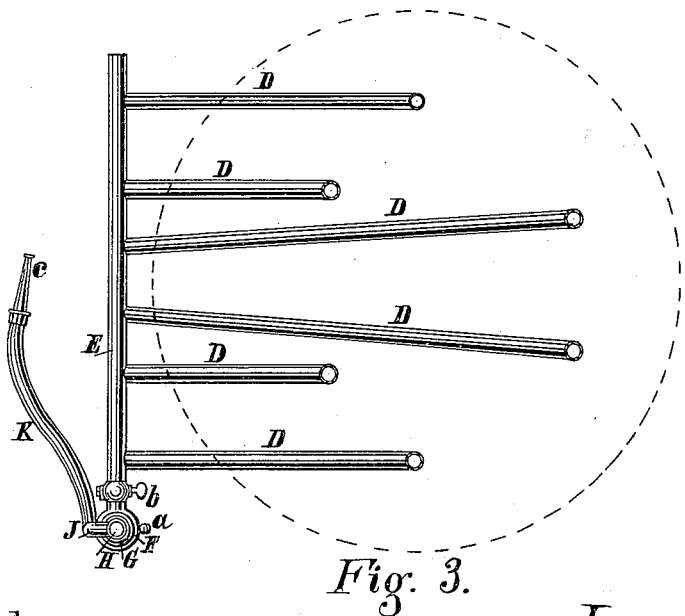

In the drawings, Figure 1 is a side elevation of so much of an apparatus embodying my invention as serves for illustration of the same. Fig. 2 is a vertical section through the tank and vertical pipes. Fig. 3 is a plan view of the pipes, the position of the tank relative thereto being indicated by the dotted line.

The vessel A represents a mash-tub or other tank in which is the liquid and mash or other mixture. In the tank A is a strainer, B, there being a space between the bottom C of the tank and the strainer B. The liquid, after passing through the strainer, passes into and through the pipes D into a pipe, E. To the pipe E is connected a vertical pipe, F, into which slides a pipe, G, a pipe, H, also sliding in the pipe G in the manner of the tubes of a telescope. Only one pipe to slide into one other, or more pipes than shown, may be employed, when the height and variation in height may be thus more simply or effectually attained.

It is desirable to have a space or receptacle, I, at the lower end of the pipe F, into which the end of the pipe G or H need not enter, where sediment may collect. There is a faucet, *a*, at the lower end of the pipe F or receptacle I, by which the liquid may be drawn out from the lowest part of the pipes and tank when the same are to be completely emptied or cleaned; and there is a faucet, *b*, in pipe E, to stop the flow of the liquid at that point, when desired.

The nozzle J, by which is the outlet-orifice, for use when straining or filtering the mixture in the tank, is at or near the upper end of the pipe H. I prefer to have the pipe H open above the nozzle J to prevent a siphon being formed when a hose, K, or other pipe is connected to the nozzle, and also that at this point water or other liquid may be let or forced into the pipes and tank, if needed for dilution or other purposes.

The parts of the apparatus being constructed and arranged substantially as shown and described, by setting the pipes so that the nozzle J will be but a little lower than the surface of the liquid in the tank, said liquid will flow through the strainer and out at this nozzle, the movement of the same being slow, owing to the slight fall; hence the filtration will be complete, there being no pressure to cause the solid matter of the mash to pack against the strainer and clog the same, or to cause channels in the thick part of the mash, as is apt to be the result when the liquid is drawn out directly at the bottom, or near the bottom, of the tank. As the liquid lowers in the tank the pipes G and H may be slid downward to keep the nozzle J at the right height relative to the surface of the liquid.

It will be seen that if a flexible pipe, as K, were attached directly to a pipe leading to the interior of the tank, as to the pipe F or E, or to one of the pipes D, the outlet being by means of said flexible pipe, by suitably placing and holding the outer end, c, of this pipe or hose, the liquid might be allowed to flow from the tank at any desired level. Such arrangement, though a very inconvenient one, would embody my invention as to a part thereof, since a pipe having an outlet-orifice adjustable as to height would be employed, in combination with a tank having a strainer to prevent the pressure and rapid flow and consequent imperfect filtration.

I claim as my invention—

1. In combination with a mash-tub or other tank having a strainer therein, a pipe or conduit adjustable so as to bring an outlet-orifice at different elevations, substantially as and for the purpose set forth.

2. The combination of a tank having a strainer therein with two or more vertical pipes, one or more to slide into the other or others, said vertical pipes, by horizontal pipes or otherwise, being connected to the tank to receive the liquid from below the strainer, and one of said vertical pipes having an outlet, substantially as specified.

3. The combination of a tank having a strainer therein and a vertical pipe connected to said tank below said strainer by one or more horizontal pipes or suitable conduits, and having a space or receptacle for sediment below said horizontal pipes, pipe, or conduit, substantially as specified.

4. The combination of mash-tub or other tank, strainer, one or more horizontal pipes, one or more vertical pipes, and flexible pipe or hose, substantially as and for the purpose set forth.

GOTTLIEB F. BURKHARDT.

Witnesses:
EDW. DUMMER,
W. H. SOLOMON.